United States Patent [19]
Verbeke

[11] 3,869,842
[45] Mar. 11, 1975

[54] BAG SEALING APPARATUS AND METHOD OF USE

[76] Inventor: Henry Verbeke, Tannersbrook Rd., Chester, N.J. 07930

[22] Filed: Aug. 6, 1973

[21] Appl. No.: 385,922

[52] U.S. Cl. .......................... 53/14, 53/39, 53/134, 53/373, 93/27, 93/35 H, 93/DIG. 1, 156/579
[51] Int. Cl. .............................................. B31b 1/86
[58] Field of Search ........... 93/35 H, 8 WA, DIG. 1, 93/27, 26, 22, 21, 18; 229/54 R, 62; 53/14, 39, 134, 373; 156/579

[56] References Cited
UNITED STATES PATENTS

| | | | |
|---|---|---|---|
| 2,606,850 | 8/1952 | Piazze | 93/DIG. 1 |
| 2,904,100 | 9/1959 | Fener | 93/DIG. 1 |
| 3,106,630 | 10/1963 | Klamp | 93/DIG. 1 |
| 3,516,223 | 6/1970 | Andersen et al. | 53/39 X |
| 3,720,141 | 3/1973 | Stock | 93/35 H X |
| 3,774,837 | 11/1973 | Franson | 229/54 R |

*Primary Examiner*—Roy Lake
*Assistant Examiner*—James F. Coan
*Attorney, Agent, or Firm*—Caesar, Rivise, Bernstein & Cohen

[57] ABSTRACT

Apparatus for sealing the mouth of a plastic bag while forming a handle therein. The apparatus includes a housing having a mouth into which the bag is inserted. Reciprocating heating means are provided for producing a pair of heat seals in the portion of the bag inserted within the housing mouth to seal that portion of the bag and to form a pocket therebetween. The heating means is brought into contact with the bag to effectuate the sealing by motor means and includes a pair of elongated electrical heating elements for producing heat when energized. The elements are disposed at an angle to one another but their heating faces are coplanar. Control means are provided for reciprocating the heating means and for energizing the heating elements in response to the insertion of the bag in the housing mouth and for deenergizing the heating elements a preselected time thereafter. The control means also cause the heating means to move out of contact with the bag after a predetermined period of time. The control means precludes the heating means from repeating the sealing operation on any one bag should the bag be left within the mouth of the housing.

16 Claims, 8 Drawing Figures

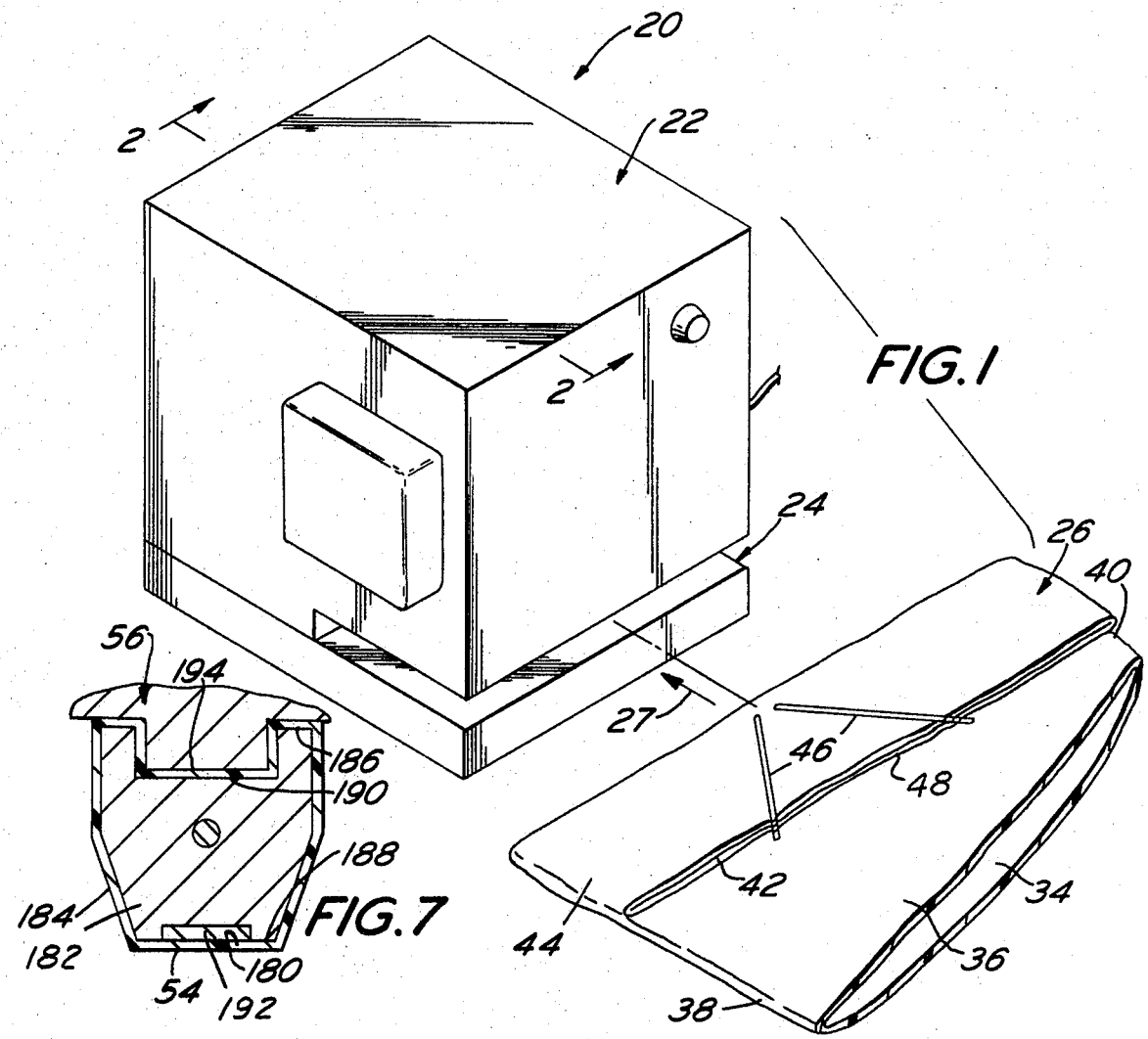
FIG. 1
FIG. 7
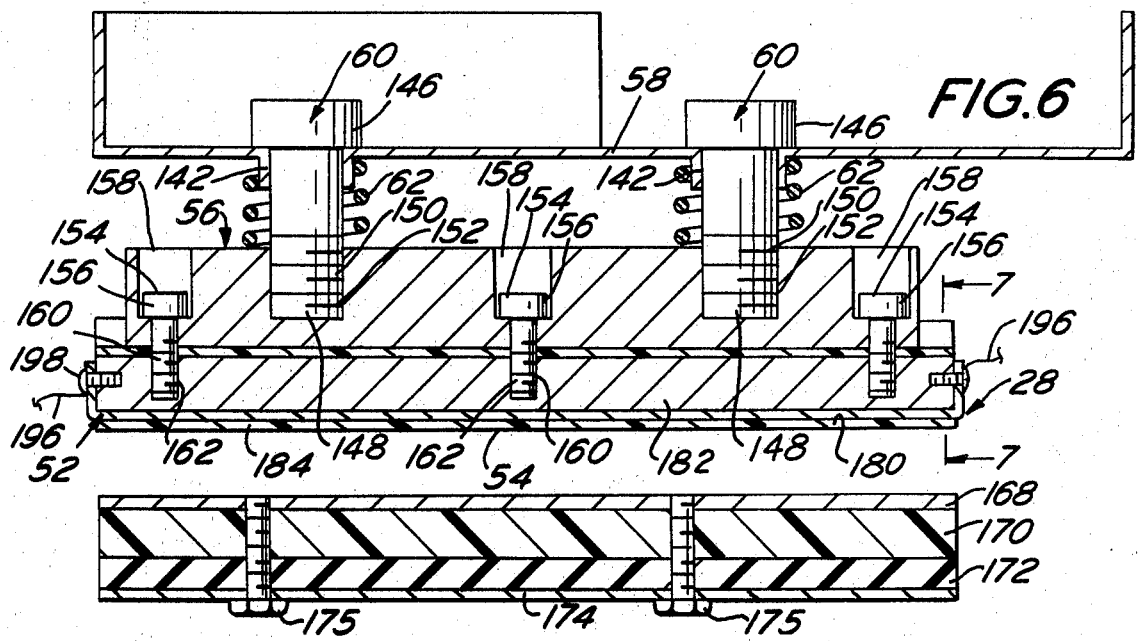
FIG. 6

BAG SEALING APPARATUS AND METHOD OF USE

This invention relates generally to heat sealing apparatus and more particularly apparatus for heat sealing and forming a handle on a plastic bag used for packaging and carrying various items of merchandise, such as clothing.

In many retail sales establishments, it has become a common practice to package the vended merchandise in plastic bags having a carrying handle. Prior to the invention disclosed in my co-pending U.S. Application Ser. No. 347,027 filed on Apr. 2, 1973, the disclosure of which is incorporated by reference herein, commercially available bags utilized one of three types of handles, namely the die cut handle which is cut out of the plastic bag, the reinforced die cut handle which is cut out of the plastic bag and is also heat sealed, and the separately fabricated handle. All such prior art handles suffer from one or more drawbacks such as cost, strength, complexity, etc.

In the above noted co-pending Application, there is disclosed and claimed a plastic bag which overcomes the problems of the prior art plastic bags insofar as handles are concerned. The bag of that invention inincludes an inexpensive handle which is both strong and easy to manufacture and additionally serves to seal the top of the bag. Accordingly, the bag can be used as an effective deterrent to shoplifting.

The plastic bag of that invention basically comprises a front wall, a rear wall, a sealed bottom and a handle on the bag. The handle comprises a flap formed from the front and rear walls and is folded over against the rear wall. A pair of heat seals are provided to secure the flap to the front and rear walls. The heat seals form a pocket therebetween into which one's hand is placed when carrying the bag. The method and apparatus of this invention are used to form the handle on the bag disclosed and claimed in my aforesaid Application Ser. No. 347,027.

It is accordingly an object of this invention to provide an apparatus and method to form a handle at the top of a plastic bag.

It is a further object of this invention to provide an apparatus and method for heat sealing the top of a plastic merchandise bag to form a handle therein.

It is yet a further object of this invention to provide relatively small apparatus which can be conveniently located at a check out station of a retail establishment to seal merchandise-holding bags while forming a handle thereon.

These and other objects of this invention are accomplished by providing apparatus for sealing the mouth of a plastic bag and forming a handle therein. The apparatus comprises a housing having a mouth into which the mouth of the plastic bag is inserted and reciprocating heating means for producing a pair of angled heat seals in the mouth of the bag to seal it and to form a pocket therebetween upon the insertion of the bag within the housing's mouth. Motor means are provided for moving the heating means into contact with the bag in automatic response to the insertion of the bag within the mouth of the housing. The heating means are preferably electrical heating elements having elongated polytetrafluoroethylene (Teflon)-coated fiberglass faces. The heating means are energized in response to the insertion of the bag into the housing mouth and are deenergized a preselected time thereafter. Means are provided for precluding the heating means for repeating operation until the bag is removed from the mouth of the housing and another bag inserted therein.

Other objects and many of the attendant advantages of this invention will be readily appreciated as the same becomes better understood by reference to the following detailed description when considered in connection with the accompanying drawings wherein:

FIG. 1 is a perspective view of a heat sealing and handle forming apparatus in accordance with this invention and showing a bag sealed thereby;

FIG. 6 is an enlarged sectional view of one heating element of the apparatus shown in FIG. 1;

FIG. 7 is an enlarged sectional view taken along line 7—7 of FIG. 6; and

Figure 2:
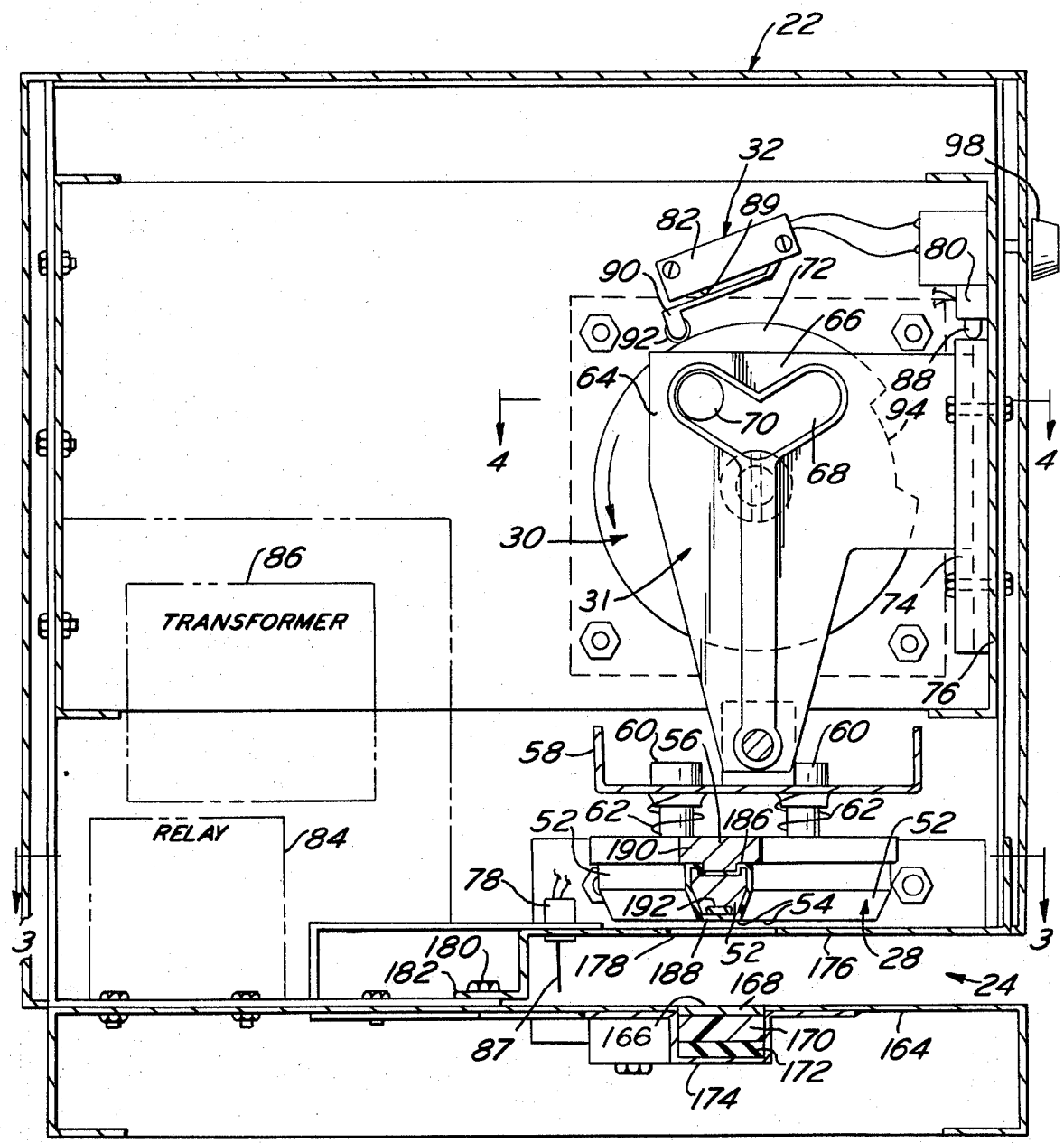
FIG. 2 is an enlarged sectional view taken along line 2—2 of FIG. -1.

Referring now in greater detail to the various figures of the drawings wherein like reference characters refer to like parts, apparatus embodying the present invention is generally shown at 20 in FIG. 1. The apparatus 20 basically comprises a housing 22 including a mouth 24 in the front of which and into which the bag 26 to be furnished with a handle is inserted in the direction of arrow 27, reciprocating heating means 28 (FIGS. 2 and 6) mounted within the housing and operative when energized for forming the handle while sealing the mouth of the bag, motor means 30 (FIG. 2) and an associated power train 31 for moving the heating means into contact with the bag and control means 32 (FIG. 2) for controlling the operation of the apparatus.

The bag 26 shown in FIG. 1 is constructed in accordance with the teachings of the aforementioned patent application and has been sealed and provided with a handle by the apparatus 20. The bag 26 basically comprises a front wall 34 and a rear wall 36 which are joined by side edges 38 and 40 and along the bottom edge ( not shown ) to form a hollow, merchandise-holding bag having a mouth portion 42. Merchandise is inserted in the hollow portion of the bag, and once in place, the mouth portion is folded over itself against the rear wall 36 to form a flap 44. The merchandise-containing bag is then positioned with its folded over flap portion within the mouth of the apparatus, whereupon the apparatus is operated to produce a pair of angled heat seals 46 in the flap and the bag portion lying thereunder.

The heat seals 46 project at 45° angles to the sides of the bag and are angled toward each other, but do not meet. The heat seals terminate just below the line at which the flap is folded, adjacent the bag's upper edges, and join the two plies of the flap 44 to the front wall 34 and rear wall 36. As can be seen, the heat seals extend downwardly approximately three-eighth of an inch below the free edge of the flap 44. Thus, the lower portions of the heat seals join the front and rear walls 34 and 36, respectively, to each other.

The heat seals 46 in combination with the flap 44 and front and rear walls 34 and 36 form the pocket 48. This pocket serves as the carrying handle for the bag 26. Thus, when it is desired to carry the bag, the four fingers of one hand are inserted upwardly into the pocket 48 and the thumb is placed on the exterior of the flap. The middle finger passes through the gap between the heat seals and the other fingers abut the heat seals. In this way, there is no danger of a fingernail piercing the line about which the flap is folded. Accordingly all of the weight of the bag is borne by the heat seals and the strength of the handle is at least as great as the tensile strength of the plastic material itself. Additionally, since there are no holes cut in the bag to form the handle, no shear areas are produced, which areas would weaken the bag.

The structural details of the interior of the housing 22 are shown in FIG. 2. As can be seen therein, the heating means 28 is disposed immediately above the housing mouth 24. The heating means are adapted for reciprocating movement between a retracted or uppermost position, shown in FIG. 2, and an extended or downward position, wherein the heating means contact the portion of the bag disposed within the housing mouth. The reciprocating movement of the heating means is effected by the motor 30 and the associated power train 31 under the control of the control means 32.

As will be considered in detail later, the heating means are electrical and comprise a pair of elongated heating elements or heat sealing bars 52 having coplanar heating faces 54. Each bar is mounted on an elongated mounting support 56. Each mounting support is in turn supported on a sealer support bracket 58, via a pair of studs 60 and respective concentric pressure equalizing springs 62.

In accordance with a preferred embodiment of this invention, the mounting supports and associated heater bars are arranged so that their longitudinal axes are normal to one another and at a 45° angle to the front of apparatus (see FIG. 3) such that when the bag mouth is inserted within the apparatus mouth in the direction of arrow 27 a pair of 45° angled heat seals 46 is produced. The support bracket 58 is mounted on the bottom of a reciprocating connecting link 64.

The upper end 66 of the connecting link includes a V-shaped guide or cam slot 68 in which a cam follower 70 is disposed. The cam follower is mounted on a cammed drive crank 72 which is connected to the electric motor 30. Upon the rotation of the motor 30, the follower 70 slides in cam slot 68 and thereby causes link 64 to reciprocate up and down.

When the motor has rotated to the angular position wherein the follower is at the bottom of the V-shaped cam slot 68, the connecting link 64 and hence the supported heating means 28 is at its lowermost or extended position. It is in this position that the heating means contacts the bag disposed within the apparatus mouth.

The connecting link is guided in its movement by a pair of elongated flanged bearings 74 mounted on a vertically oriented front support panel 76 of the housing.

The reciprocal displacement of the link 64 is greater than the reciprocal displacement of the heating means 28 supported thereby, with the spring 62 and associated stud 60 taking up the excess travel when the heating means is extended. This action ensures that even pressure is applied to the portion of the bag within the apparatus mouth irrespective of differences in the thickness of that portion of the bag.

The rotation of the motor 30 and hence the reciprocation of the heating means 28 is controlled by control means 32. The control means basically comprise three electrical switches, namely, an actuating switch 78, a follow-through switch 80 and an energization switch 82, plus a time delay relay 84 and the cam drive crank 72. Electric power for the heating means is provided by an electrical transformer 86.

Figure 5:
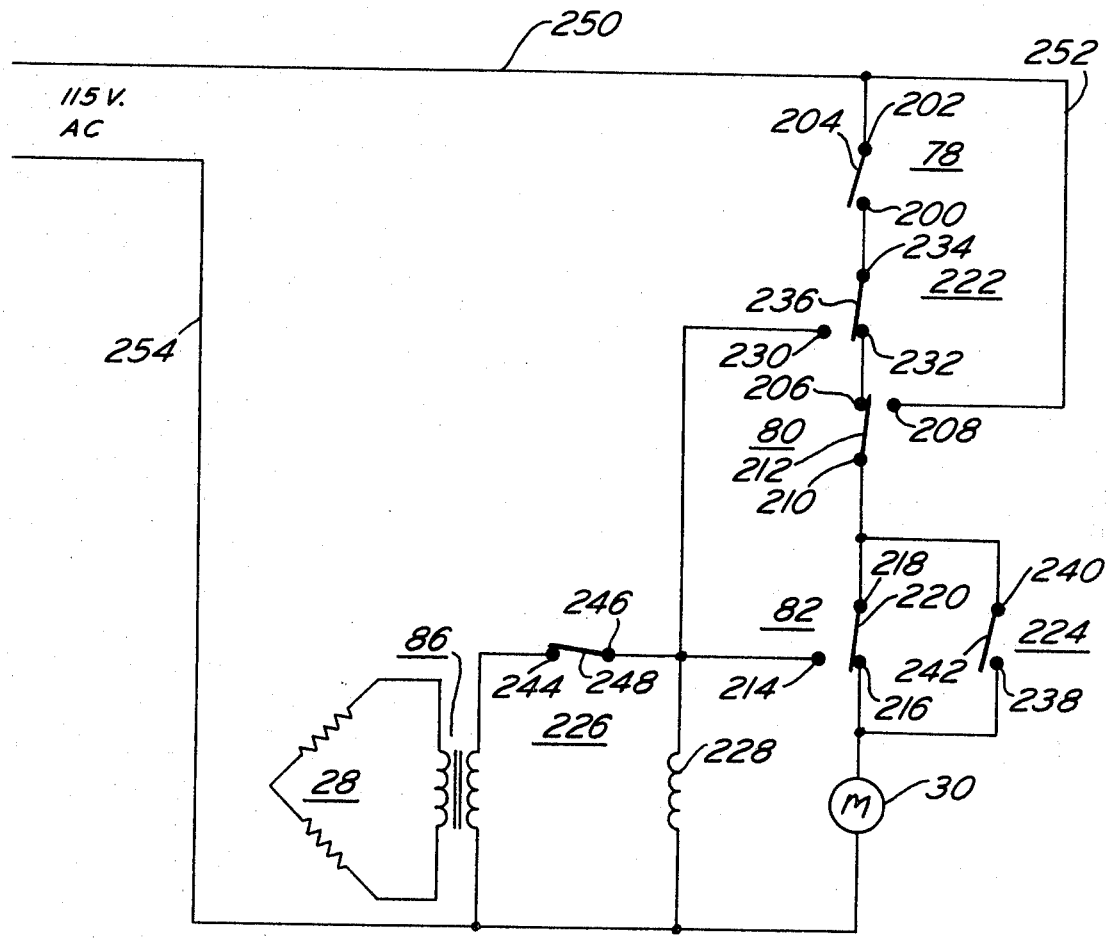
FIG. 5 is a schematic circuit diagram of the electrical components of the apparatus.

In FIG. 5 there is shown the electrical circuitry of apparatus 20. As can be seen therein, the actuating switch 78 comprises a normally opened contact 200 and a common contact 202 connected to a contactor 204. The contactor is coupled to an actuating arm 87 (FIG. 2) of the switch 78.

The follow-through switch 80 comprises a normally opened contact 206, a normally closed contact 208 and a common contact 210 connected to a contactor 212. The contactor 212 is coupled to an actuating button 88 (FIG. 2) of the switch 80.

The energization switch 82 comprises a normally closed contact 214, a normally opened contact 216 and a common contact 218 connected to a contactor 220. The contactor 220 is coupled to an actuating button 89 (FIG. 2) of the switch 82. The switch 82 also comprises an outwardly biased arm 90 having a roller 92 connected at its free end which rolls along the periphery of crank 72 as the crank rotates under the influence of the motor.

The time delay relay 84 is of the delayed lock-in type and includes three sets of contacts 222, 224 and 226 and an actuating coil 228. The set 222 includes a normally opened contact 230, a normally closed contact 232 and a common contact 234 connected to a contactor 236. The set of contacts 224 comprises a normally opened contact 238 and a common contact 240 connected to a contactor 242. The contact set 226 comprises a normally closed contact 244 and a common contact 246 connected to a contactor 248.

The electrical circuitry of the control means is interconnected as follows. A line 250 is directly connected to the common contact 202 of switch 78 and is connected via shunt line 252 to a normally closed contact 208 of follow-through switch 80. Line 250 is adapted to be connected to one side of a 115 volt a.c. power source, such as a conventional wall receptacle. The other side of the a.c. power source is connected via line 254 to the common junction of one side of the primary of transformer 86, one side of the time delay relay coil 228 and one side of the motor 30. The other side of the primary of transformer 86 is connected to normally closed contact 244 of relay set 226. The common contact 246 of relay set 226 is connected to the other side of the time delay relay coil 228, the normally closed contact 214 of switch 82 and the normally opened contact switch 230 of time delay relay contact set 222. The normally opened contact 216 of switch 82 is connected to the common point of the other side of motor 30 and the normally opened contact 238 of the time delay relay contact set 224. The common contact 240 of the time delay relay contact set 224 is connected to the common contact 218 of the switch 82 and to the common contact 210 of the switch 80. The normally opened contact 206 of switch 80 is connected to the normally closed contact 232 of time delay relay set 222. The common contact 234 of time delay relay set 222 is connected to the normally opened contact 200 of actuating switch 78.

Operation of the appartus is as follows: Prior to the insertion of a bag within the mouth of the apparatus, the electrical circuitry of the apparatus is in the condition shown in FIG. 5. The actuating switch 78 is mounted within the mouth 24 of the apparatus with its arm 87 arranged to cause contactor 204 to move into contact with normally opened contact 200 upon being forced backward by the insertion of the bag within the mouth in the direction of arrow 27. This action provides electrical power to the motor through the circuit made up of line 250. the closed contacts of switch 78, the closed contacts of time delay relay set 222, the closed contacts of follow-through switch 80, the closed contacts of enenrgization switch 82 and line 254. Upon being energized, the motor starts rotating, which effects the downward movement of the heating means 28 from the position shown in FIG. 2 and also causes the cam drive crank to rotate.

The actuating button 88 of the follow-through switch 80 is mounted immediately above the flanged bearing 74 of the apparatus such that when the link is in its uppermost position, the actuating button 88 is depressed and the switch 80 is in the condition shown in FIG. 5. Upon the commencement of downward movement of the heating means, the actuating button 88 of the follow-through switch is released which causes the contactor 212 of the follow-through switch to move of contact with contact 206 and into contact with contact 208. This action enables electrical power to continue to be provided to the motor through the shunt line 252, the closed contacts of switch 80, the closed contacts of switch 82 and line 254.

The energization switch 82 is adapted to provide electrical power to the time delay relay coil 228 and to the transformer 86 upon the movement of its actuating arm 90 outwardly and out of contact with its energizing button 89, i.e., by the movement of contactor 220 into contact with contact 214. To that end, as can be seen in FIG. 2, the crank 72 includes a recessed section 94 in its periphery and which is located a predetermined angular distance from the angular position of the cam follower 70. The roller 92 of switch 82 is positioned such that it is directly over the recess 94 when the heating means 28 is at the lowermost or extended position. Accordingly, when the heating means is in the position where it will be in contact with a bag disposed within the apparatus mouth, the roller 92 of the switch 82 drops into the recess 94, whereupon the arm 90 moves away from the energizing button 89, thereby resulting in the movement of contactor 220 into contact with contact 214. This action results in the provision of electrical energy to the time delay coil 228 and the transformer 86. Thus, power is provided to the coil via the path comprising line 250, the shunt line 252, the now closed contacts of switch 80, the now closed contacts of switch 82 and the line 254. Power is provided to the transformer 86 in a similar manner, but also through the closed contacts of the time delay contact set 226.

Upon the movement of contactor 220 into contact with contact 214 it moves out of contact with switch 216 and thereby interrupts the flow of power to the motor 30, whereupon the motor stops.

Upon the passage of current through the primary of transformer 86, the heater means 28 energize which results in the production of heat thereby. The heat produced by the heatings means melt the plastic of the bag in contact therewith to produce the heat seals 46 in the bag.

The time delay relay 84 is arranged to delay a predetermined period of time after its coil 228 is energized, during which time electrical power is provided to the heating means as described above, and upon the elapsing of that time the relay 84 "picks up" and causes the contactors 236, 242 and 248 to move to the opposite position from that shown in FIG. 5. This action cuts off power to the heating means via the now opened contacts of time delay relay contact set 226. The length of time that the relay 84 keeps the heating means energized is established by the setting of an adjustable potentiometer 96 connected to a manually rotatable knob 98 (FIG. 2).

The picking up of time delay relay 84 causes contactor 242 to move into contact with contact 238 and thereby enables power to be provided to the motor via the path made up of line 250, the shunt line 252, the closed contacts of the time delay relay contact set 224 and line 252. Upon being reprovided with electrical energy, the motor again begins rotating, thereby raising the heating means 28 out of contact with the plastic bag. The continued rotation of motor 30 serves to raise the link 64 to its uppermost position, whereby it makes contact with the actuating button 88 of the follow-through switch 80. This action causes contactor 212 to move back into contact with contact 206, thereby interrupting the flow of power through the shunt line. Since the time delay relay has picked up, its contactor 236 is out of contact with contact 232, thus, the flow of electrical power to the motor is interrupted. This action causes the motor to cease rotating and stops the apparatus in its uppermost position.

When the bag is removed from the mouth of the apparatus, the arm 87 of the actuating switch 78 is released, which action results in the movement of contactor 204 out of contact with contact 200 and thus deenergizes the time delay relay coil 228. Upon the deenergization of the relay coil 228, the contactors 236, 242 and 248 of the relay 84 move to the position shown in FIG. 5, thereby readying the apparatus for another heat sealing operation.

In the event that the bag is inadvertently left within the apparatus mouth after the sealing operation, even though the actuating switch 78 remains closed, the motor 30 remains off since power thereto is interrupted by the opened contacts of time delay relay contact set 222. Thus, the relay remains energized until the actuating switch 78 is released. This action prevents repeated operation of the apparatus if the operator does not remove the sealed bag immediately after one operating cycle.

Figure 4:
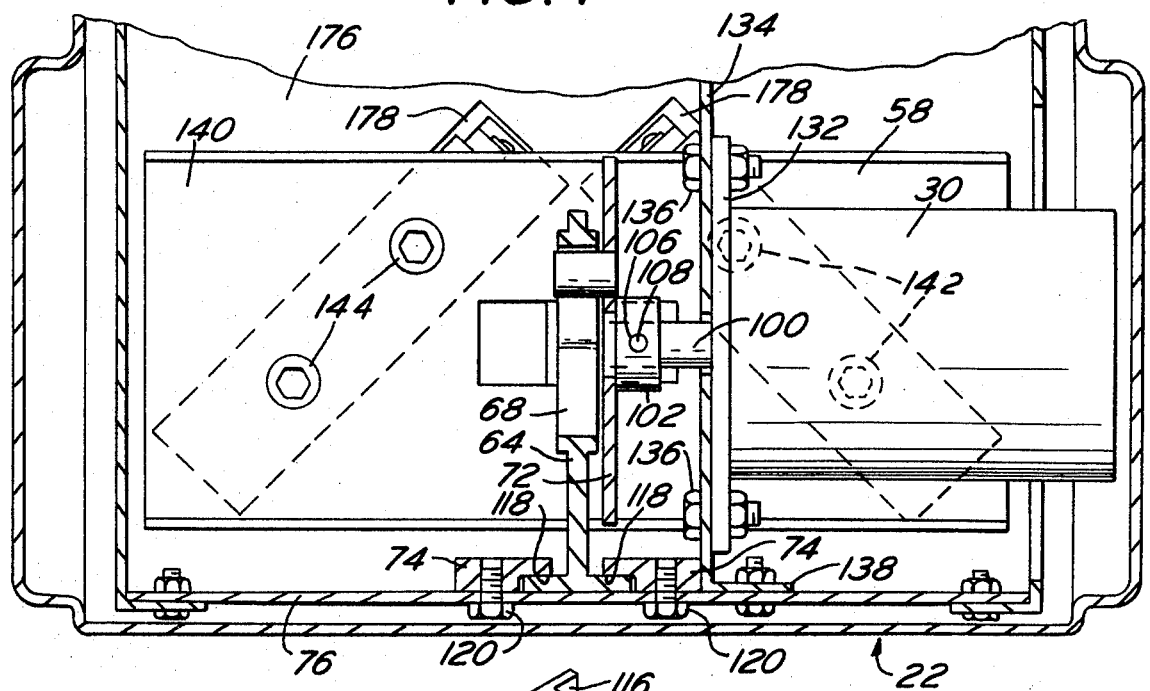
FIG. 4 is a sectional view taken along line 4—4 of FIG. 2.
Figure 8:
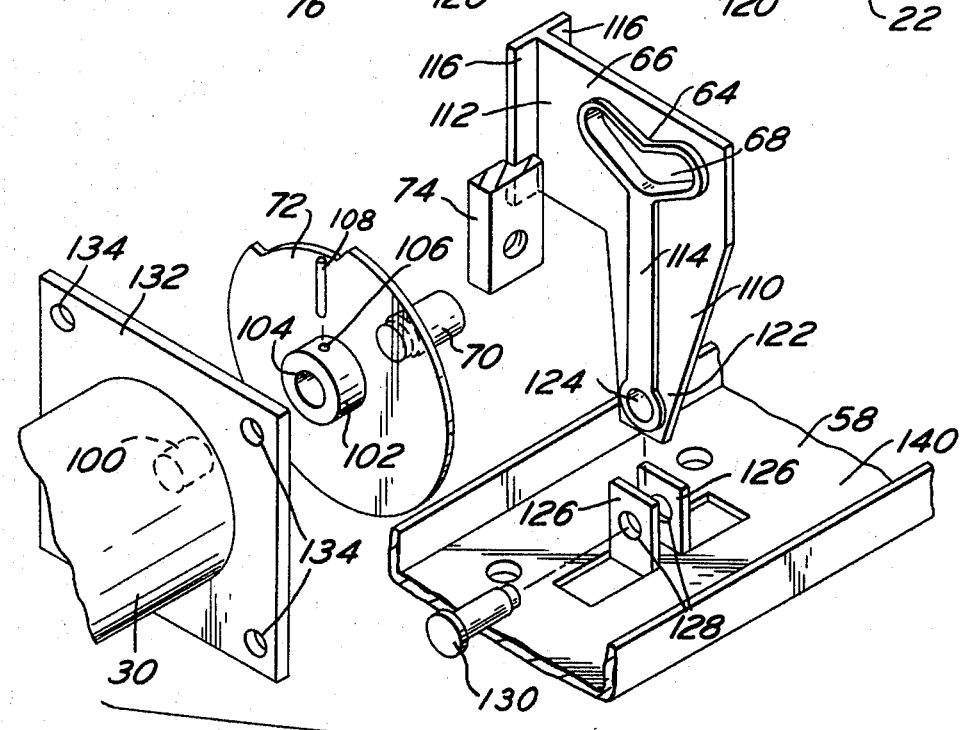
FIG. 8 is an exploded view of a portion of the apparatus shown in FIGS. 2 and 4.

The structural details of the power train 31 can best be seen in the exploded perspective view of FIG. 8 and in the sectional view of FIG. 4. As can be seen, the motor 30 includes a short rotating drive shaft of stub 100 having a diagonally extending hole therein (not shown). The cammed crank 72 includes a centrally located annular sleeve 102 having a central hole 104 therein. The crank is connected to the stub by inserting the stub within the central hole 102 in the annular sleeve 104. The sleeve 104 includes a diagonally extending hole 106 through its walls which aligns with the diagonal hole in the stub 100 when the stub is inserted within the sleeve. A pin 108 is inserted in the aligned holes to secure the crank 72 onto the stub 100.

The connecting link 64 includes a generally elongated portion 110 having a wing 112 projecting laterally therefrom. The elongated portion 110 is structurally stiffened by a longitudinally extending rib 114. The rib terminates at its upper end at the bottom of the V-shaped cam slot 68. A pair of flanges 116 extend normally from the link along the side edge of the wing 112. The flanges are received within slots 118 (FIG. 4) provided between the respective bearings 74 and the front support panel 76. The bearings 74 are elongated in shape and are secured vertically in place on the panels by bolts 120. The lower end 122 of the elongated portion of the link 64 includes a hole 124. The hole serves as the means for connecting the sealer support bracket 58 and hence the heater means 28 carried thereby to the power train 31. To that end, the sealer support bracket 58 includes a pair of upstanding parallel ears 126, each including an aligned hole 128 and defining a yoke into which a lower end of the link is disposed, with the hole 124 aligned with the holes 128. A cylindrical stud 130 is inserted in the aligned holes to secure the bracket to the link, while enabling the bracket to rotate slightly with respect thereto. This action enables the heating means to be brought into even contact with the bag within the apparatus mouth irrespective of variations in the thickness of the walls of the bag.

As can be seen in FIG. 8, the motor 30 includes a front mounting plate 132 having four mounting holes 134, (only three of which can be seen), with one in each corner of the plate. As seen in FIG. 4, the motor is mounted on a transverse support panel 134 in the housing 22, via bolts 136 provided through the mounting holes 134 and aligned holes (not shown) in the transverse support panel. The transverse support panel includes a flange 138 along its vertical edge which serves as the means for bolting the transverse panel to the front panel 76.

As previously noted, the heating means comprises two elongated heat sealing bars 52. The bars are mounted so that their longitudinal axes are normal to one another and are preferably at a 45° angle to the front of the housing (see FIG. 3). To that end, as can be seen in FIG. 4, the sealer support bracket 58 includes a base portion 140 having two pair of flanged mounting holes 142 and 144 therein, with the lines connecting the holes of each pair extending normally to one another and at a 45° angle to the transverse axis of the bracket. Each pair of holes serve as the means for supporting one heat sealing bar 52 and its associated mounting support 56. For example, as can be seen in FIG. 6, each 60 is disposed within a respective hole 142, with its head 146 disposed on top of the bracket 58 and with its shank 148 extending through the hole 142 and terminating in a threaded end 150 which is screwed into a threaded hole 152 in the mounting support 56. The studs are enabled to slide longitudinally through their associated holes to take up any excess travel of the heating means, i.e., to enable the link to continue to move downward even after the heating means makes contact with the plastic bag in the apparatus mouth. The springs 62 are disposed about their associated studs and are interposed between the bottom of the bracket 58 contiguous with the flanged hole 142 and a top surface of the mounting support 56 contiguous with the threaded hole 152.

The above described stud-spring connection arrangement not only equalizes the pressure applied to the portion of the bag disposed under the heating bars when the heating means is in its extended or downward position and in contact with a plastic bag, but also eliminates the need for precision parts in the power train 31.

The heating bars 52 are mounted on the mounting supports 56 by three screws 154. As can be seen, each screw 154 is disposed with its head 156 within a countersunk hole 158 in the mounting support 56 and with its threaded end 160 screwed into a threaded hole 162 in the heating bar 52.

The bottom of the apparatus mouth 24 comprises a base or plate 164, upon which the plastic bag is disposed when being sealed. The base 64 includes a pair of identical elongated sealing platens 166 (FIG. 3) which serve as the back-up against which the respective heating bars 52 apply heat and pressure to effect the heat sealing of the plastic bag layers disposed on the platens. As can be seen in FIG. 2, the platens comprise three elongated and stacked bars 168, 170 and 172 disposed within a channelled support 174 mounted below the base 164. The bar 168 is disposed at the bottom of the three bars and is formed of steel to reinforce the platen. The bar 170 is disposed immediately above the steel bar and serves as a shock absorbing member to absorb the shock produced as the heating means is brought into contact with the bag on the platen. The bar 172 is disposed on top of bar 168 and is the uppermost bar in the platen.

In order to provide a non-stick surface and thereby minimize the chance of softened plastic adhering to the platens, the uppermost bar 170 is formed of a silicone material. The three bars forming the platen are bolted together in the channel support by a plurality of bolts 175 (see FIG. 6).

Figure 3:
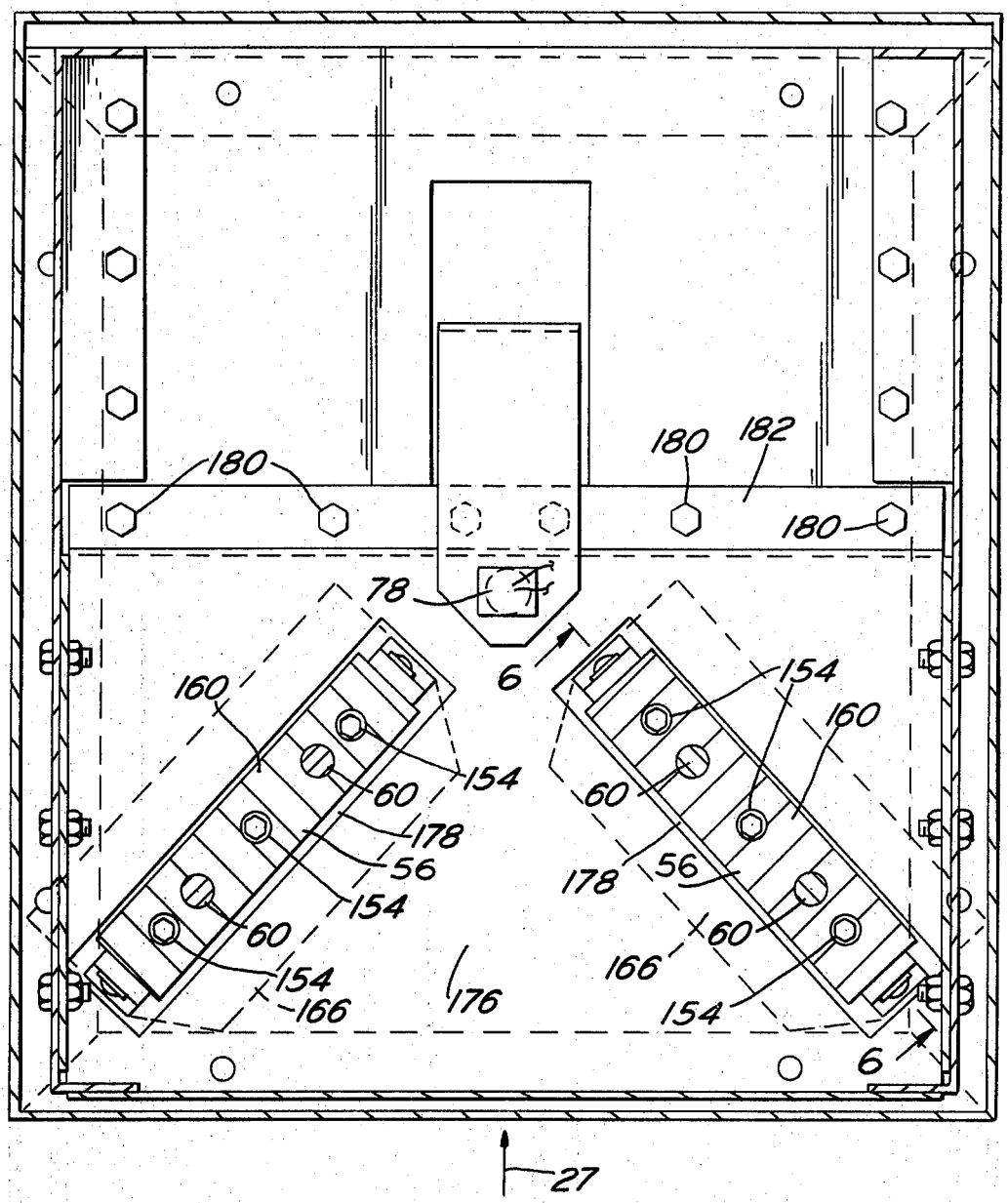
FIG. 3 is a sectional view taken along line 3—3 of FIG. 2.

At the top of the mouth of the apparatus, there is disposed a strip-off means 176 which is in the form of a planar panel having a pair of elongated slots 178 (FIGS. 2 and 3) therein. The panel is mounted above the base 164, via a plurality of bolts 180 through a flange 182 in the edge of the panel. As can be seen in FIG. 3, the slots 178 in the panel are dimensioned and disposed as as to enable the elongated heating bars to pass therethrough when the heating means is reciprocated to its extended or downward position. With the strip-off means 176 arranged as shown, if the plastic bag adheres to the heating bars during the heat sealing operation, the retraction of the bars through the associated slots in the strip-off means after the sealing operation effectively strips the adhered bag from the bars.

The heating bars 52 of the instant invention are of novel construction and basically comprise an assembly of a heating ribbon or wire 180, a holding bar 182 and an assembly tube 184 which serves to hold the assembly together securely and without the use of complicated securement means such as springs, clamps, etc.

As can be seen in FIGS. 2 and 7 the holding bar 182 is an elongated bar-like member having a pair of opposed horizontal faces 186 and 188 which include recesses 190 and 192, respectively, therein. The sides of the holding bar 182 are disposed normal to the plane of the top face 186 are contiguous therewith, and taper inwardly from their middle towards the lower face such that the elower face is narrower than the upper face.

The heating ribbon 180 is a conventional resistance heating element which produces heat upon the passage of electric current therethrough and is in the shape of a relatively thin strip with its width being at least wice its thickness. The strip is disposed within recess 192 in the holding bar 182, which recess id configured and dimensioned to conform to the shape of the strip disposed therein, such that when the strip is disposed within the recess, the bottom face of the strip lies in the plane of the lower face of the holding bar.

The strip 180 is held firmly in place by the assembly tube 184. The assembly tube is relatively thin-walled so as to be very flexible, and in accordance with the preferred embodiment of this invention is formed of polytetrafluoroethylene (Teflon) coated fiberglass. The tube is disposed about the holding bar and ribbon seated therein and is of the same length as the mounting bar. The peripheral lenght of the opening of the tube is slightly greater than the length of the gross periphery of the bar, that is the outside periphery minus the recesses or the combined height of the two sidewalls plus the combined width of the opposed horizontal faces.

The recess 190 in the top face 186 of the holding bar is of a greater depth than the length of the periphery of the tube minus the length of the gross periphery of the holding bar for a reason to be discussed hereinafter.

The mounting support bar 56 is an elongated member having a rib 194 (FIG. 7) projecting from its lower face and which is adapted to be inserted within the recess 190 in the top face of the holding bar 182 to effect the interconnection of the heater bar assembly. To that end, the height of the rib is approximately the same as the depth of the recess 190 minus the thickness of the wall of the assembly tube, with the width of the rib being approximately the same as the width of the recess minus twice the thickness of the wall of the tube, such that the rib is enabled to fit within the recess with a portion of the wall of the assembly tube disposed therebetween.

As will be appreciated by those skilled in the art, when the assembly tube 184 is disposed about the holding bar 182 and ribbon 180 seated therein, with a portion of the tube forced into the recess 190 by the rib 194, the assembly tube is drawn tightly against the lower face of the bar to firmly hold the ribbon in place. The portion of the assembly tube disposed over the heating rib and the contiguous lower face of the holding bar defines the heating face 54 of the heating means 28.

As can be seen in FIG. 6, the ends of the heating ribbon 180 are bent normally to the plane thereof and are in contact with the ends of the holding bar 182. Electrical power is provided to the ribbon via electrical wires 196 connected to the respective ends of the ribbon by screws 198.

The Teflon-coated fiberglass sleeve is a relatively good thermal conductor such that when current is provided to the heating means 28 by the transformer 86, as described previously, the narrow longitudinal strip along the heating face and over the heating ribbon is raised to a relatively high temperature, which is effective to melt the plastic material with which it is brought into contact, thereby to effect the production of the elongated heat seals 46. The Teflon coating serves to preclude the adherence of melted plastic to the heating means.

Operation of the apparatus 20 is as follows:

Merchandise (not shown) is inserted in the hollow portion of the bag 26, and once in place the mouth portion thereof is folded over itself and against the rear wall 36 to form flap 44. The merchandise-holding bag is then inserted into the mouth 24 of the apparatus in the direction of arrow 27. The presence of the portion of the bag within the mouth of the apparatus results in the closure of actuating switch 78 disposed therein. The closure of switch 78 begins the sealing cycle by enabling electric power to be provided to the motor, whereupon the motor begins rotating. The rotational movement of the shaft 100 of the motor 30 is converted into a linear motion by the power train such that the link 64 moves downward. The heating means, carried by the link 64, is thus brought into contact with the portion of the bag disposed within the apparatus mouth. The studs 60 and associated springs 62 serve to take up excess linear travel and thereby ensure that even pressure is provided to the bag, irrespective of variations in the thickness thereof.

Upon the heating means 28 reaching the lowermost point in its travel, i.e., making contact with the bag, the recess 94 in the crank 72 is disposed immediately below the roller on contactor 90 of the energization switch 82, whereupon the switch actuates. This action effects the interruption of electric power to the motor, whereupon the motor ceases rotating, thereby stopping the heating means in contact with the bag, and at the same time enables electric power to be provided through the time delay relay to the heating means. The provision of electrical power to the heating means effects the production of heat therein, which heat causes the abutting plastic to melt and thereby produces the pair of angled heat seals 46 in the bag.

A predetermined length of time after the commencement of the heating operation, which time is adjusted by the position of knob 98, the relay 84 "picks up." This action effects the interruption of power to the heating means and at the same time enables electrical power to be provided to the motor. Upon the provision of power thereto, the motor 30 begins rotating again. This action effects the lifting of the heating means out of contact with the bag.

Should the bag adhere to the heating means, notwithstanding the non-adherent surface providing by the Teflon coating, when the heating means retracts through the openings 178 in the stripping means at the top of the mouth of the apparatus, the adhered bag is stripped away.

When the link contacts the button of the follow-through switch at the end of its upward movement, the flow of electrical power to the motor is interrupted, thus shutting the motor off and holding the heating means in its uppermost position.

The bag is thereafter removed from the mouth of the apparatus which effects the release of the actuating switch. This action deenergizes the relay and readies the apparatus for another sealing operation.

The heat sealing apparatus of this invention is compact and is relatively light in weight such that it may be relocated easily. This enables the apparatus to be used wherever desired in retail sales establishments, e.g., at a sales desk, a check out counter, a bagging station, etc.

Furthermore, the apparatus is effective to place a handle on a bag in a few seconds and hence does not slow down the merchandise check out process. Furthermore, by sealing the mouth of the bag while providing a handle thereon, the apparatus prevents the use of the bag as a shoplifting tool.

While the means for reciprocating the sealing means have been shown and described as being a motor 30 and a power train 31, it should be noted that other means may be utilized in lieu thereof. For example, a solenoid can be used to provide the reciprocation of the sealing means by mounting the sealing means on the piston of the solenoid.

Without further elaboration, the foregoing will so fully illustrate our invention that others may, by applying current or future knowledge, readily adapt the same for use under various conditions of service.

What is claimed as the invention is:

1. For use with a plastic bag having a front and a rear wall and a flap, said bag having an article disposed therein, with said flap being folded over said rear wall to close the bag, apparatus for forming a handle in said bag, said apparatus comprising a housing having a mouth into which said flap and the abutting rear wall of the bag is inserted and reciprocating heating means operative after the insertion of the bag within said apparatus mouth for producing a pair of heat seals in the flap and abutting rear wall to seal the flap to the abutting rear wall, thereby sealing the article within the bag while forming a pocket between said seals, which pocket serves as the handle for the bag.

2. The apparatus of claim 1 wherein the heating means is arranged so that the heat seals formed thereby are disposed at an angle to one another but do not meet.

3. The apparatus of claim 1 additionally comprising motor means for moving the heating means into contact with the bag disposed within the housing mouth.

4. Apparatus for forming a handle in a plastic bag, said bag having a flap folded thereagainst at its top, said apparatus comprising a housing having a mouth into which the flap of said bag is inserted, reciprocating heating meansa for producing a pair of heat seals in the flap to seal the flap to the bag portion lying thereunder and to form a pocket therebetween upon the insertion of the bag within the housing mouth, and motor means for moving the heating means into contact with the bag disposed within the housing mouth, said motor means moving the heating means into contact with the bag in automatic response to the insertion of the bag within the housing mouth.

5. The apparatus of claim 4 wherein the heating means is electrically heated.

6. The apparatus of claim 5 wherein the heating means comprises a pair of elongated electric heating elements for producing heat when energized, each element including a heating face, said elements being disposed normally to one another but with their heating faces being coplanar.

7. The apparatus of claim 6 wherein each of said heating elements comprise an elongated holding member having a longitudinal groove therein in which a resistance heating element is disposed, said heating element being held in place by an elongated sleeve disposed about said insulating member and said heating element.

8. The apparatus of claim 7 wherein said sleeve is polytetrafluoroethylene coated fiberglass.

9. The apparatus of claim 6 and additionally comprising control means for energizing the heating elements in response to the insertion of the bag within the housing mouth and for deenergizing said heating elements a preselected time thereafter.

10. The apparatus of claim 9 wherein said preselected time is established by adjustable means.

11. The apparatus of claim 10 wherein the control means causes said heating element to move out of contact with the bag after a predetermined time.

12. The apparatus of claim 11 wherein the control means include means for precluding the apparatus from repeating operation until the bag is removed from the mouth of the housing and another bag inserted therein.

13. Apparatus for forming a handle in a plastic bag, said bag having a flap folded thereagainst at its top, said apparatus comprising a housing having a mouth into which the flap of said bag is inserted, reciprocating heating means for producing a pair of heat seals in the flap to seal the flap to the bag portion lying thereunder and to form a pocket therebetween upon the insertion of the bag within the housing mouth, and control means for energizing the heating means in response to the insertion of the bag within the housing mouth and for deenergizing said heating means a preselected time thereafter, said control means including means for precluding the apparatus from repeating operation until the bag is removed from the mouth of the housing and another bag is inserted therein.

14. A method for sealing a plastic bag having an article disposed therein while forming a handle for said bag, said bag having a front and a rear wall and a flap folded against said rear wall comprising the steps of disposing the flap and the abutting rear wall under a heating means having a pair of angled elongated heating elements, automatically moving said heating means into contact with the mouth of said bag, and heating said heating means to form a pair of angled heat seals in the flap to seal the article therein by forming a pocket between the seals, which serves as a handle for the bag and thereafter automatically moving the heating means out of contact with the bag.

15. The method of claim 14 wherein the heating of said heating means is automatically stopped a predetermined period of time after said means are moved into contact with the bag.

16. The method of claim 15 wherein said period of time is adjustable.

* * * * *